(12) United States Patent
Nichols, Sr.

(10) Patent No.: US 6,209,593 B1
(45) Date of Patent: Apr. 3, 2001

(54) ELECTRIC IN-LINE SNORKEL PUMP FOR HELICOPTER TANKER AND METHOD OF OPERATION

(75) Inventor: Delmar G. Nichols, Sr., Munger, MI (US)

(73) Assignee: Carry Manufacturing, Munger, MI (US)

(*) Notice: Subject to any disclaimer, the term of this patent is extended or adjusted under 35 U.S.C. 154(b) by 0 days.

(21) Appl. No.: 09/635,326

(22) Filed: Aug. 9, 2000

Related U.S. Application Data

(63) Continuation of application No. 09/404,675, filed on Sep. 23, 1999, now abandoned.

(51) Int. Cl.⁷ .................................................. A62C 3/02
(52) U.S. Cl. .................. 141/231; 141/2; 141/21; 141/382; 169/46; 169/53; 417/371; 417/423.3; 417/423.9
(58) Field of Search .................................. 141/2, 18, 21, 141/231, 382; 417/371, 423.3, 423.9; 169/46, 53; 137/899.2

(56) References Cited

U.S. PATENT DOCUMENTS

| | | | |
|---|---|---|---|
| Re. 24,909 | * 12/1960 | Dochterman | 417/423.9 |
| 1,609,762 | * 12/1926 | Morgan | 169/53 |
| 3,220,482 | * 11/1965 | Eveleth | 169/53 |
| 3,369,715 | * 2/1968 | Carter | 417/423.3 |
| 3,434,565 | * 3/1969 | Bellmer | 417/371 |
| 3,442,334 | * 5/1969 | Gousetis | 169/53 |
| 3,759,330 | * 9/1973 | Rainey et al. | 169/53 |
| 3,786,397 | * 1/1974 | Bridges | 439/277 |
| 3,897,829 | * 8/1975 | Eason | 169/53 |
| 4,793,386 | * 12/1988 | Sloan | 141/231 |
| 4,979,571 | * 12/1990 | MacDonald | 169/53 |
| 5,061,157 | * 10/1991 | Arakawa | 417/423.3 |
| 5,135,055 | * 8/1992 | Bisson | 169/53 |
| 5,451,016 | * 9/1995 | Foy et al. | 169/53 |

* cited by examiner

Primary Examiner—J. Casimer Jacyna
(74) Attorney, Agent, or Firm—Reising, Ethington, Barnes, Kisselle, Learman & McCulloch, P.C.

(57) ABSTRACT

A pump system for a helicopter tanker includes an axial flow electric pump coupled to a lower end of a snorkel having a generally tubular pump housing extending along a central axis between an open upper end and an opposite open lower end serving as an inlet of the pump. An in-line electric motor is supported within the housing along the axis and has an output drive shaft mounting an impeller. A filter screen basket is mounted on the lower end of the housing to filter water for filtering the incoming water. An electric power cable extends from the motor through a the housing and is shrouded externally by a protective metal cable guard.

13 Claims, 4 Drawing Sheets

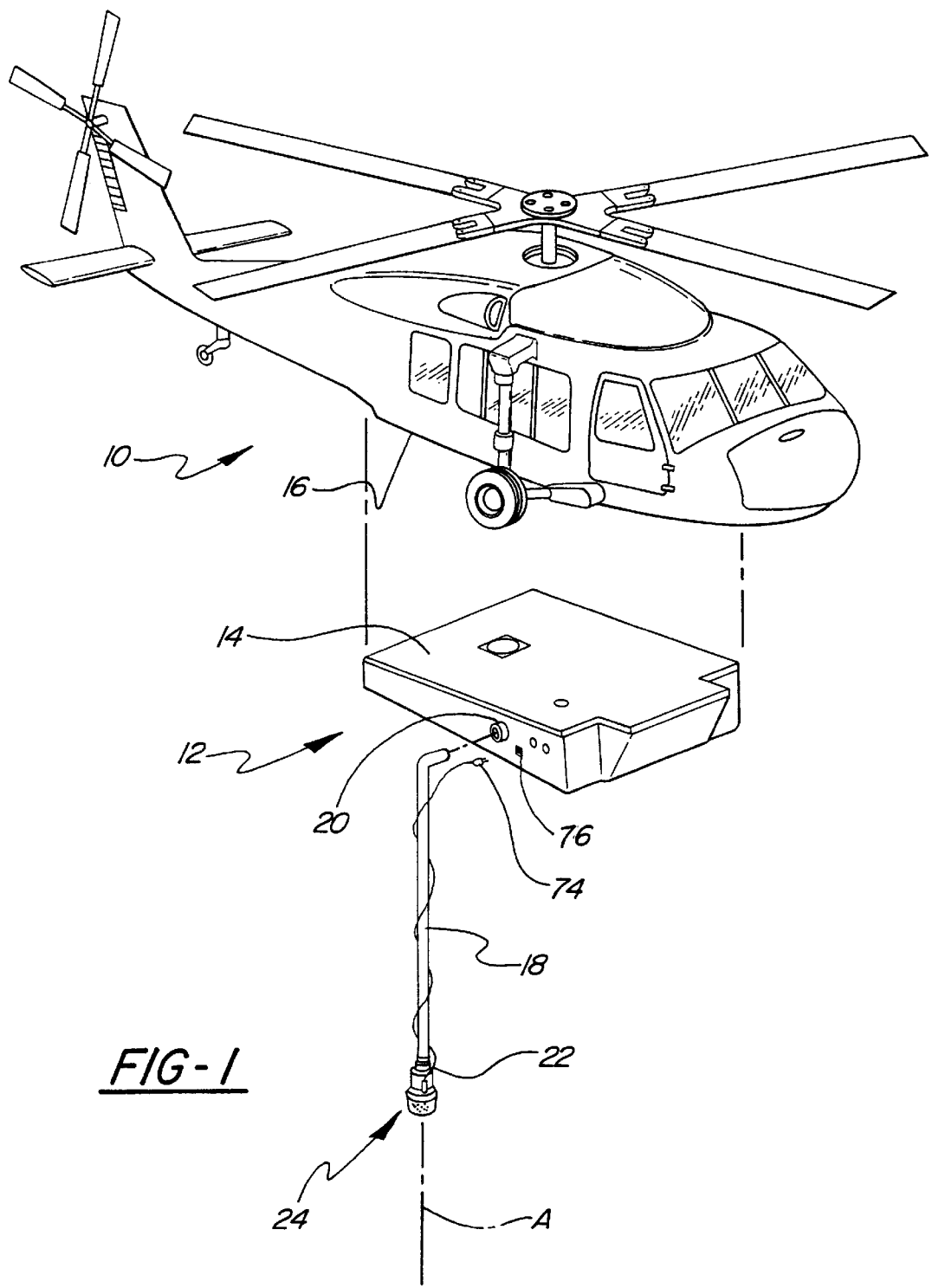

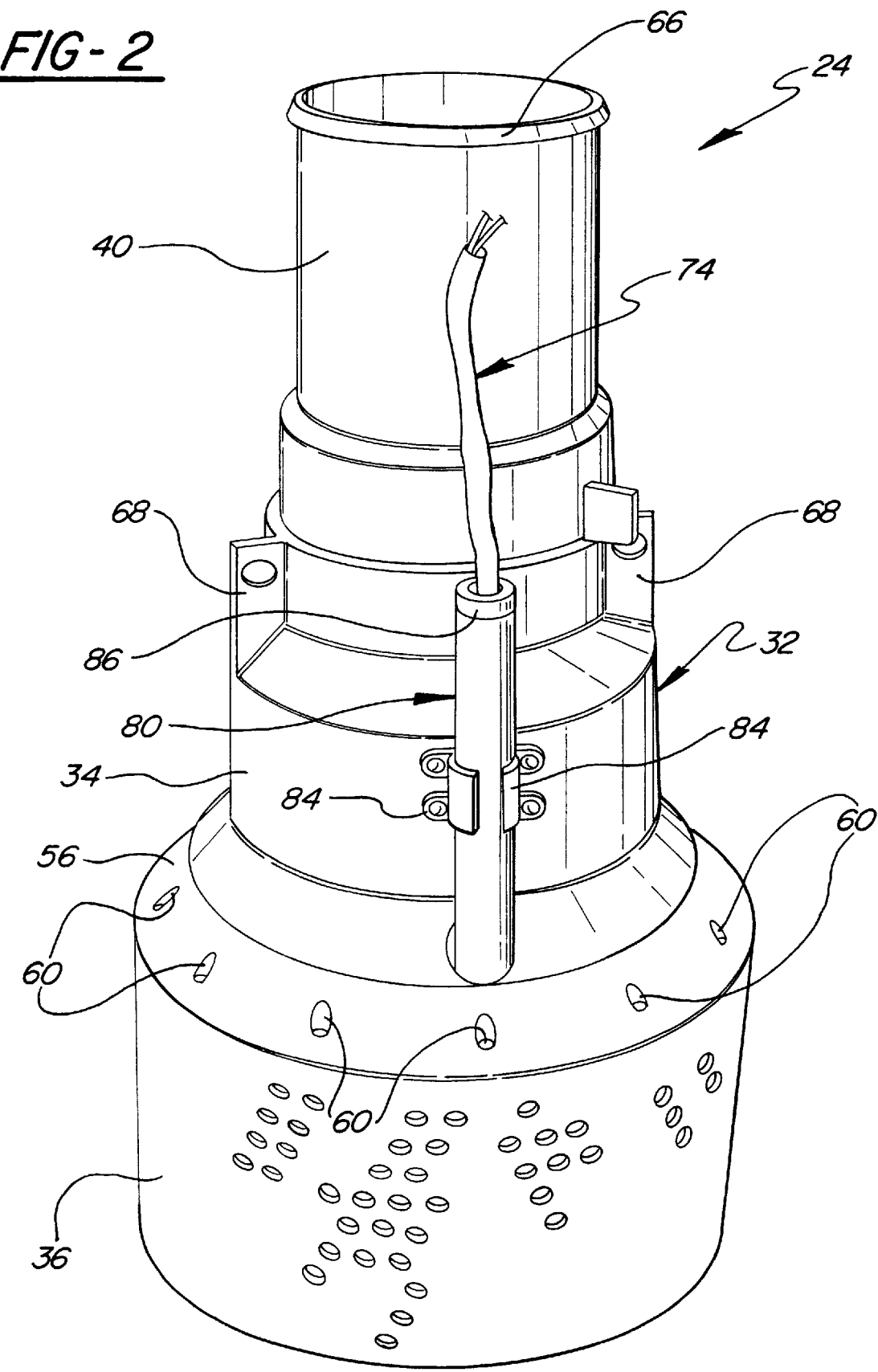

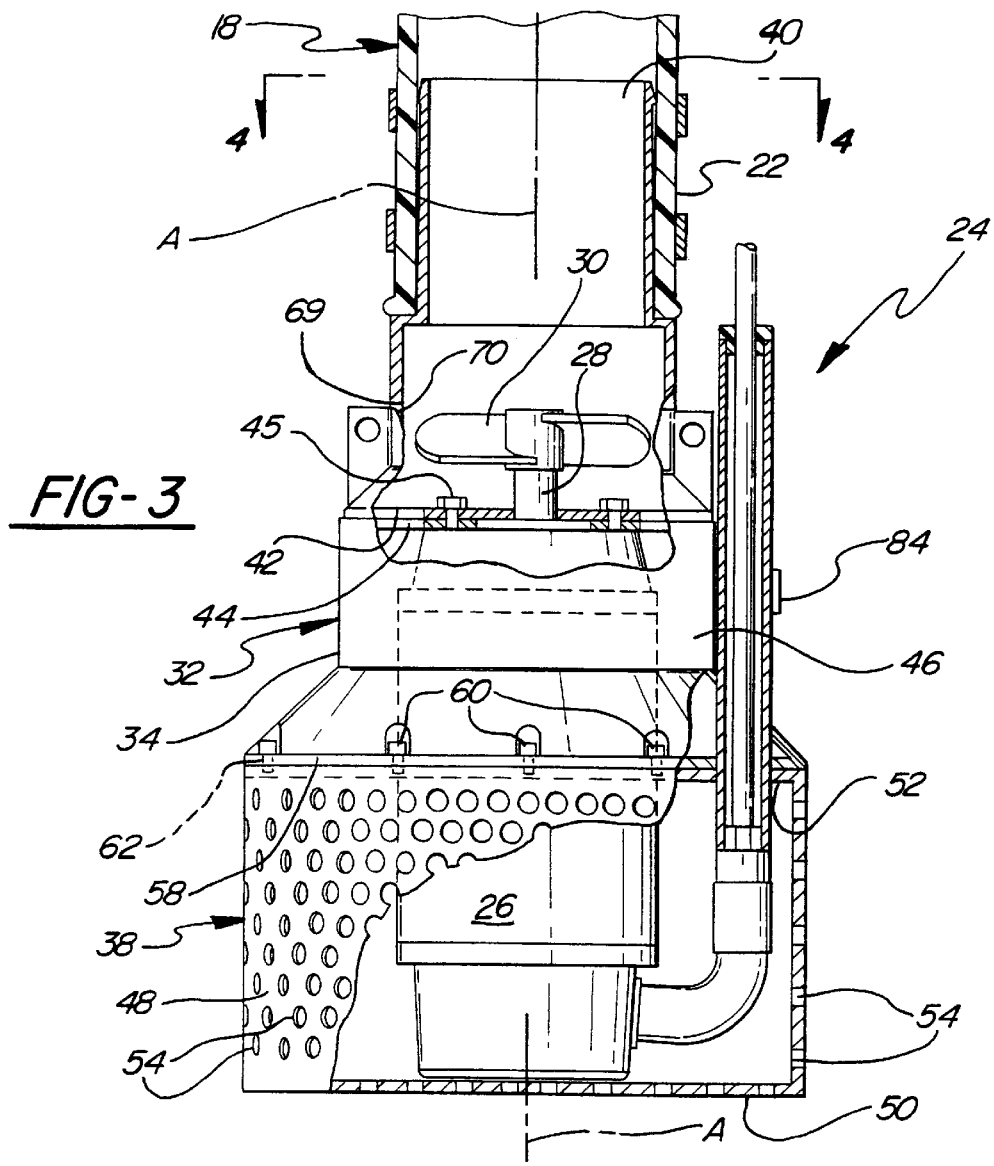
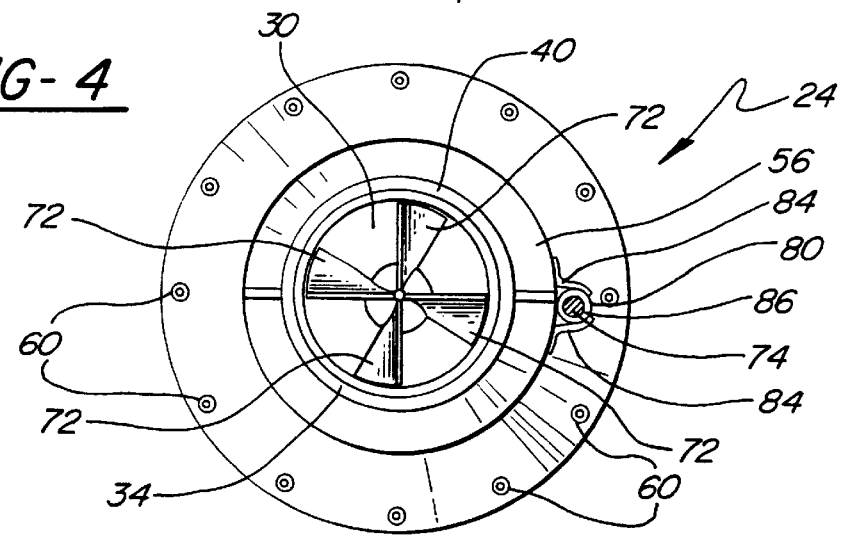

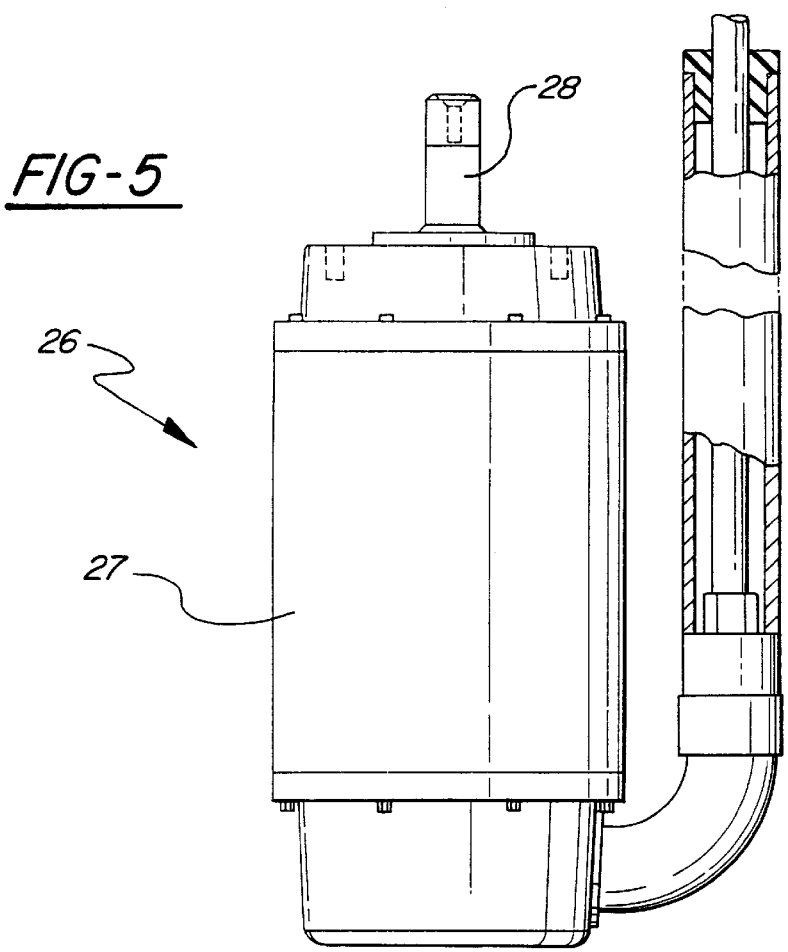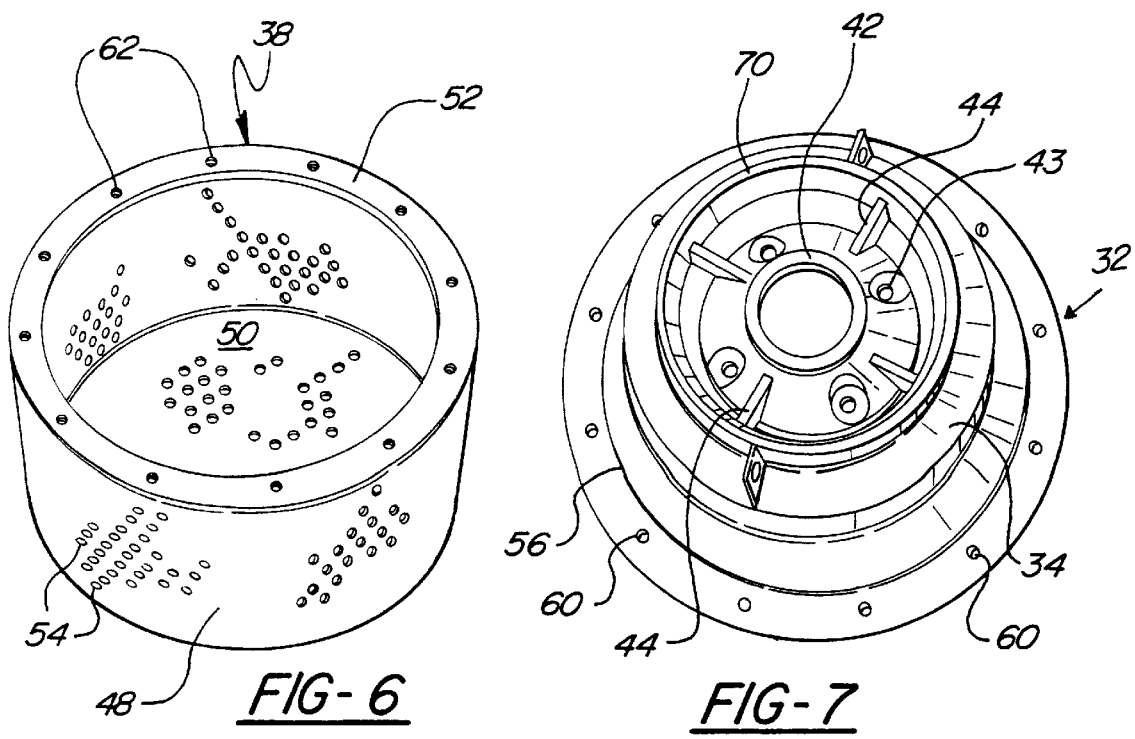

ELECTRIC IN-LINE SNORKEL PUMP FOR HELICOPTER TANKER AND METHOD OF OPERATION

This application is a continuation of application Ser. No. 09/404,675, filed Sep. 23, 1999, now abandoned.

This invention relates to helicopter tankers used for fighting ground fires and more particularly to the pump system used to draw water through a snorkel into an onboard holding tank from a body of water such as a lake, river, swimming pool, or the like. The disclosure incorporates the electric in-line snorkel pump for helicopter tanker and method of operation disclosed in provisional patent application 60/101,639, filed Sep. 24, 1998, whose priority is claimed for this application.

BACKGROUND OF THE INVENTION

Erickson Air-Crane Company manufactures a helicopter equipped for aerial fire fighting known as the SK-64 Skycrane Helitanker. See website. A 2,000 gallon tank is fixed to the belly of the helicopter. A fill tube or snorkel extends from the tank and mounts a submersible hydraulic pump at its free end which can be lowered into a body of water for pumping water up the snorkel and into the tank. The snorkel has a 10 inch diameter and a length of about 20 feet or more. About the first 10 feet of the snorkel is required for clearing the landing gear and the remaining length provides clearance between the helicopter and the body of water.

The pump employed is a centrifugal hydraulic pump which is capable of filling the 2,000 gallon tank in less than one minute with a 20 foot lift. The pump weighs about 285 pounds and draws about 20–30 HP of available horsepower from the hydraulic system of the helicopter.

While the Skycrane Helitanker is very effective at fighting ground fires, it has certain disadvantages. The large flow rate and horsepower requirements of the hydraulic pump effectively limit the application of this pumping system to Type 1 (large) military heavy-lift helicopters which have the available hydraulic horsepower to drive the pump. The application of such a hydraulic pump tanker system on smaller military lift helicopters is not known, and understandably so, since they would not have the available hydraulic horsepower capacity needed to drive the pump and would not have the available lift capacity to support the tanker system. The Blackhawk military helicopter, for example, has a lift capacity of about 10,000 pounds.

Another inherent limitation of the Skycrane Helitanker is that is dedicated to lifting and not designed to carry passengers. It would be advantageous to have a firefighting helicopter that, in addition to transporting and spreading water on ground fires, could also transport firefighters to or from the location of the ground fire, particularly while returning with an empty water tank. It would further be desirable to provide a pumping system suited for smaller lift helicopters that would be substantially lighter and would require substantially less horsepower to operate than that of the centrifugal hydraulic pump system of the Skycrane.

SUMMARY OF THE INVENTION

A pumping system for a helicopter tanker is provided in which an electric axial flow pump is mounted to the free end of a snorkel extending from an onboard storage tank. The electric pump is one that is capable of delivering 1,000 gpm through a 6 inch diameter snorkel at a head of about 12 feet and operates at about 7.5 horsepower off a 10 kW or less on board generator. The electric axial flow pump of the invention weighs a fraction of the hydraulic centrifugal pump used in the Skycrane application (70 pounds vs. 285 pounds). The lower horsepower requirements make the pump system suitable for use on smaller helicopters which are not able to accommodate the hydraulic centrifugal pump of the Skycrane. For example, a military Blackhawk passenger helicopter equipped with a 1,000 gallon tank and a 6 inch diameter snorkel having a length of about 12 feet and fitted with the 7.5 horsepower electric axial flow pump unit is able to operate off the available 10 horsepower capacity of the helicopter within the 10,000 pound load capacity when loaded with water. The electric axial flow pump does not rob the helicopter of its limited hydraulic resources that are used to operate the helicopter (e.g., turn its rotors). Use of such an electric axial flow pump in the Skycrane application is not known and would be disadvantageous, since such a pump would have great difficulty meeting the 2,000 gpm flow rate requirements in conjunction with a 10 inch diameter snorkel and 20 feet of head.

In addition to the low power and weight advantages, the electric axial flow pump system of the invention is axially balanced with respect to the snorkel, and thus easily supported in-line with the axis of the snorkel. The centrifugal hydraulic pump has its outlet offset axially from the central axis of the pump and requires an added cable to balance the pump axially on the snorkel.

According to a particular feature of the invention, an electrical power cable extends from the helicopter along the outside of the snorkel and passes into a protective shrouding on the pump unit. In use, when the pump is lowered into a body of water, such as a lake, stream, swimming pool, tank or the like, the shrouding protects the cable from being damaged should the pump unit strike a solid object such as a rock or the wall of a tank or pool during filling.

According to yet a further particular feature, the pumping unit has a housing that is at least partly conical or tapered on its exterior to minimize the presence of abrupt shoulders and/or protrusions which might become snagged on objects in or near the body of water during filling.

Still another important advantage of the present pumping system is that it can be installed on smaller lift helicopters of the type designed to carry passengers as well as lift cargo, thereby enabling the helicopter so equipped to serve not only as a fire fighting aircraft, but also for passenger transport.

THE DRAWINGS

A presently preferred embodiment of the invention is disclosed in the following description and in the accompanying drawings, wherein:

FIG. 1 is an exploded perspective view of a helicopter tanker equipped with an axial flow electric pump system of the present invention;

FIG. 2 is an elevational perspective view of the electric pump of the invention;

FIG. 3 is an elevational view of the axial flow electric pump system of the invention;

FIG. 4 is a plan view taken generally along lines 4—4 of FIG. 3;

FIG. 5 is an enlarged elevation view of the electric motor component of the pump system;

FIG. 6 is a perspective view of the filter basket component of the invention; and FIG. 7 is a perspective plan view of the main body section of the pump housing.

DETAILED DESCRIPTION

FIG. 1 shows a helicopter tanker generally at 10 which may comprise a Blackhawk military passenger lift helicopter equipped with a fire fighting tank system 12 according to the invention. The helitanker 10 has an available 10 horsepower capacity and a load lifting capacity of about 10,000 pounds.

The water delivery system 12 includes a water holding tank 14 suspended from the underside or belly or 16 of the helicopter 10. A flexible water intake hose or snorkel 18 is fixed at its upper end to an inlet 20 of the tank 14 and extends therefrom to a free end 22 to which an electric axial flow pump system 24 is attached and is operative to pump water from a source such as a lake, stream, tank, swimming pool, or the like (not shown) through the snorkel and into the tank 14. The snorkel 18 has preferably a 6 inch inner diameter and a length of about 12 feet. The length is sufficient to clear the landing gear of the helicopter and to provide about 8 feet or more below the landing gear to provide adequate clearance for the helicopter 10 above the body of water during filling.

The pump system 24 includes an electric pump motor assembly 26 which is preferably a three phase, 400 hertz, 115 volt electric motor able to operate on 10 kW or less power supply at a rating of 7.5 horsepower. The motor 26 includes a motor body 27 in which the usual working components of an electric motor are housed. An output shaft 28 extends from the body 27 along a central axis A of the pump 24 and mounts an impeller 30 for driven rotation by the motor 26.

The motor 26 is mounted within a housing 32 of the pump assembly 24. The housing 32 has a tubular open-ended main body 34 mounting a filter screen basket 38 at its lower end and a snorkel adapter 40 at its upper end. As shown best in FIGS. 3 and 7, the main body section 34 has an inner hub 42 mounted in spaced relation to the inner wall of the main body section 34 by webs 44. The hub 42 is formed with mounting holes 43 that receive suitable screw fasteners 45 for mounting the motor 26 within the housing 32 in radially spaced relation to the inner wall to provide an annular flow path 46 around the motor 26 and through the main body section 34.

The filter basket 38 as shown best in FIGS. 2, 3, and 6, includes a cylindrical side wall 48 having a diameter relatively larger than that of the main body section 34. The side wall 48 is fixed at its lower end to a circular end wall 50 and fixed at its upper end to an annular mounting ring or flange 52. The side and end walls 48, 50 are perforated to admit water into the basket 38 through the walls 48, 50 while excluding debris. It is preferred that the openings 54 be closely spaced to admit a maximum amount of water without detracting from the structural integrity of the basket. It is preferred that the openings 54 be about ½ inch in diameter and be spaced from one another by about ½ inches.

The main body 34 includes an outwardly flaring skirt portion 56 adjacent its lower end that is preferably frustoconical in shape. The skirt 56 has a generally planar annular mounting face 58 corresponding in size and shape to the mounting flange 52 of the filter basket 38. A plurality of screw fasteners 60 are arranged in equal circumferentially spaced relation about the skirt 56 and extend into correspondingly arranged threaded openings 62 of the mounting flange 52 for securing the basket 38 securely but releasably to the housing 32, thereby enclosing the lower end of the housing 32 to assure that any water entering the pump housing 32 passes first through the filter basket 38.

The snorkel adapter 40 comprises a tubular extension of the main body section 34 having a diameter relatively smaller than that of the main body section 34. The diameter corresponds preferably in size to the inner diameter of the snorkel 18 to enable the adapter 40 to be extended the lower open end 22 of the snorkel 18 for mounting (see FIG. 3). The overlapping lower end 22 of the snorkel 18 may be secured to the adapter 40 by means such as retaining bands 64. It is preferred that the free end of the adapter be formed with a radially enlarged annular lip 66 to assist in retaining the snorkel 18 on the adapter 40. Of course, other mechanical fastening means can be used to secure the snorkel 18 to the adapter 40, including but not limited to clamps, fasteners, adhesives, and the like.

As shown best in FIGS. 2 and 3 the body 34 of the housing 32 may be fitted with external cable attachments 68 which may be provided for attaching the pump assembly 24 to a cable winch (not shown) of the helicopter 10 to raise and lower the pump assembly 24 relative to the helicopter 10. As shown best in FIG. 9, the snorkel adapter 40 is preferably formed with external screw threads 68 that mate with interior screw threads 70 of the body 34 for mounting the adapter 40 securely but releasably on the body section 34. The adapter 40 is further formed with internal straightening fins 72 (FIG. 4) arranged downstream of the impeller 30 and operative to align the flow of water issued from the impeller 30 in the axial direction A of the pump.

The pump assembly 24 includes an electrical power cord or cable 74 coupled at its lower end to the motor 26 and connectable at its opposite end to a 10 kw or less power supply 76 of the helicopter 10 for supplying operating power to the pump system 24. As shown best in FIGS. 2–5, the pump 24 includes a cable guard 80 extending from. the housing 32 that operates to shield an otherwise exposed portion 75 of the cable 74 outside of the housing 32 from damage without obstructing the flow path 46 of the pump 24. The cable guard 80 preferably comprises a section of conduit 82 fixed at its lower end to the motor 26 at the point where the cable 80 passes into the motor body 27 (see FIGS. 2, 3 and 5), and extending therefrom through the filter basket 38 and through a longitudinal opening 84 in the skirt 56 and terminating outside of the pump housing 32 adjacent the base of the snorkel adapter 40. It is preferred that the conduit 82 extend closely alongside the outer surface of the main body 34 to enhance the structural integrity of the cable guard 80 and to minimize the possibility of snagging the cable guard 80 on objects during filling. The cable guard 80 may be fixed such as by welding or by brackets 84 to the outer wall of the housing 32 to provide added structural integrity to the conduit 82. The upper free end of the conduit 80 is preferably fitted with an internal bushing 86 fabricated of a low friction material such as nylon or the like to minimize stress and/or chaffing of the cable 74 where it exits the cable guard 80. All components of the pump housing 32 and filter basket 38 are made of a light weight material and preferably aluminum, with the exception of the impeller which is cast of 316 stainless steel. The pump assembly 24 has a weight in the range of about 70 pounds.

In operation, the pump assembly 24 is attached to the free end 22 of the snorkel 18 in the manner described and lowered into a body of water (not shown), whereupon the pump 24 is actuated to deliver water at a rate of about 1,000 gallons per minute through the 12 feet snorkel 18 to fill the tank 14 to capacity. Operation of the pump is then discontinued and the helicopter is flown to the site of a ground fire whereupon the load of water is discharged from the tank 14 onto the fire and the helicopter returned to reload the tank with water. This process is repeated as often as necessary, with the pump 24 being designed to operate for at least one minute between five minute intervals of down time.

When the pump 24 is activated, the impeller 30 draws water into the housing 32 through the filter basket 38 where it passes around the motor 26 along the flow path 46. As the flow of water enters the snorkel adapter 40, it passes through the straightening fins 72 which redirect and align the flow axially along the snorkel 18. The flow of water past the motor 26 advantageously cools the motor 26 during operation.

The disclosed embodiment is representative of a presently preferred form of the invention, but is intended to be illustrative rather than definitive thereof. The invention is defined in the claims.

I claim:

1. A pumping system for a helicopter tanker adapted for drawing from a body of water to fill an onboard holding tank of the helicopter, comprising:

an elongate tubular snorkel having an upper end connectable to an inlet of the holding tank and an opposite lower end;

an axial flow electric pump having a generally tubular pump housing extending along a central axis between an open upper end mountable on said lower end of said snorkel and an opposite open lower end serving as an inlet of said pump, an in-line electric motor supported within said housing along said axis, an output drive shaft extending from said motor along said axis, an impeller mounted on said shaft for driven rotation therewith, a filter screen basket mounted said lower end of said housing to filter water drawn into said housing through said lower end thereof, an electric power cable extending from said motor through a said housing, and a cable guard comprising a metal conduit coupled in water-tight relation to said motor at a lower end thereof and extending therefrom through said housing to an opposite end external of said housing and accommodating a lower section of said power cord external of said housing for protecting said lower section from damage due to impact with foreign objects during use.

2. The pumping system of claim 1 wherein said conduit extends along side said housing in closely adjacent relationship thereto.

3. The pumping system of claim 1 wherein an upper end of said conduit is fitted with a low friction bushing.

4. The pumping system of claim 1 wherein said housing has a generally cylindrical main body section and an outwardly flaring skirt portion coupled to said main body section and mounting said filter basket.

5. The pump system of claim 4 wherein said conduit extends along side said main body section.

6. The pump system of claim 5 wherein said conduit is fixed externally to said main body section.

7. The pump system of claim 1 wherein said housing includes a generally cylindrical main body section and a smaller diameter snorkel adapter mounted to an upper end of said body section, said adapter having a free end configured for releasable connection with the snorkel.

8. The pump system of claim 7 wherein said snorkel adapter includes inner straightening fins downstream of said impeller and operative to align the flow of water issued from the impeller in the axial direction of the pump.

9. A method of filling an onboard holding tank of a helicopter tanker with water, comprising:

coupling an upper end of an elongate tubular snorkel to an inlet of the holding tank;

providing an axial flow electric pump having a generally tubular pump housing extending along a central axis between an open upper end mountable on said lower end of the snorkel and an opposite open lower end serving as an inlet of the pump, an in-line electric motor supported within the housing along the axis, an output drive shaft extending from the motor along the axis, an impeller mounted on the shaft for driven rotation therewith, a filter screen basket mounted the lower end of the housing to filter water drawn into the housing through the lower end thereof, an electric power cable extending from the motor through a the housing, and a cable guard comprising a metal conduit coupled in water-tight relation to the motor at a lower end thereof and extending therefrom through the housing to an opposite end external of the housing and accommodating a lower section of the power cord external of the housing for protecting the lower section from damage due to impact with foreign objects during use; and coupling the pump to a lower end of the snorkel and submersing the pump in a body of water and operating the pump motor to draw water through the pump and snorkel into the holding tank.

10. A pumping system for a helicopter tanker adapted for drawing from a body of water to fill an onboard holding tank of the helicopter, said system comprising:

an elongate tubular snorkel having an upper end connectable to an inlet of the holding tank and an opposite lower end; and a submersible axial flow electric pump having a sealed submersible electric pump motor, a water inlet, and a pump outlet, said pump outlet being coupled to said lower end of said snorkel, said electric pump motor having an electric power cable sealed in water-tight relation to said pump motor to provide electrical power to said pump motor while submersed, said electrical power cable extending from said pump motor along said snorkel to an opposite end connectable to an onboard electric power supply of the helicopter.

11. The pumping system of claim 10 wherein said pump includes a protective cable guard structure enshrouding a lower portion of said electric cable to protect said electric cable from damage during use.

12. A method of filling an onboard holding tank of a helicopter tanker with water, comprising:

coupling an upper end of an elongate snorkel to an inlet of the holding tank;

providing a submersible axial flow electric pump having a water inlet, a pump outlet, a sealed submersible electric pump motor operative to draw water in through the water inlet and discharge the water through the pump outlet, and an electric power cable coupled at one end to said electric pump motor in water-tight relation thereto and extending therefrom along the snorkel to an opposite end;

coupling the opposite end of the power cable to an onboard power supply of the helicopter tanker to supply electrical power to the submersible pump; and submersing the pump in a body of water while supplying electrical power through the power cord to operate the pump to draw water through the pump and snorkel into the holding tank.

13. The method of claim 12 including providing a protective shrouding about the cable where the cable connects to the pump to guard the cable against damage during operation of the pump.

* * * * *

UNITED STATES PATENT AND TRADEMARK OFFICE
CERTIFICATE OF CORRECTION

PATENT NO.    : 6,209,593 B1
DATED         : April 3, 2001
INVENTOR(S)   : Delmar G. Nichols, Sr.

Page 1 of 1

It is certified that error appears in the above-identified patent and that said Letters Patent is hereby corrected as shown below:

Title page,
Item [56] References Cited, insert -- OTHER PUBLICATIONS
Pre-1998 CMI Brochure - Water Flow Management
Aquaculture, 2 pages
Pre-1998 CMI Brochure - Stormwater Management, 2 pages
Pre-1998 CMI Brochure - Water Flow Management, 2 pages
Pre-1998 CMI Brochure - Create Beautiful and Ascetic Waterfalls and Artesian Wells, 2 pages
1991 CMI Axial Flow Pump Drawing - (note: confidential information redacted)
Pre-1998 Dewatering Designers Pump Brochures - Hydraulic Sludge Pumps, 4 pages
July 1998 Website Materials, Erickson Air-Crane Company - Aerial Firefighting, Helitankers, Dip Tanks, 4 pages --

Column 1,
Line 20, after "website" insert -- www.erickson-aircrane.com/firefighting.htm --

Signed and Sealed this

Eighteenth Day of December, 2001

*Attest:*

*Attesting Officer*

JAMES E. ROGAN
*Director of the United States Patent and Trademark Office*